United States Patent
Lackner (10) Patent No.: US 12,121,849 B2
(45) Date of Patent: Oct. 22, 2024

(54) SYSTEM AND METHOD FOR CARBON DIOXIDE CAPTURE THROUGH MEMBRANE CONDUITS

(71) Applicant: Klaus Lackner, Paradise Valley, AZ (US)

(72) Inventor: Klaus Lackner, Paradise Valley, AZ (US)

(73) Assignee: Arizona Board of Regents on Behalf of Arizona State University, Scottsdale, AZ (US)

(*) Notice: Subject to any disclaimer, the term of this patent is extended or adjusted under 35 U.S.C. 154(b) by 453 days.

(21) Appl. No.: 17/601,053

(22) PCT Filed: Apr. 2, 2020

(86) PCT No.: PCT/US2020/026427
§ 371 (c)(1),
(2) Date: Oct. 1, 2021

(87) PCT Pub. No.: WO2020/206148
PCT Pub. Date: Oct. 8, 2020

(65) Prior Publication Data
US 2022/0203292 A1    Jun. 30, 2022

Related U.S. Application Data

(60) Provisional application No. 62/829,007, filed on Apr. 3, 2019.

(51) Int. Cl.
*B01D 53/14* (2006.01)
*B01D 53/22* (2006.01)
*C01B 32/50* (2017.01)

(52) U.S. Cl.
CPC ..... *B01D 53/1425* (2013.01); *B01D 53/1475* (2013.01); *B01D 53/1493* (2013.01);
(Continued)

(58) Field of Classification Search
CPC ............ B01D 53/1425; B01D 53/1475; B01D 53/1493; B01D 53/229; B01D 2239/0428;
(Continued)

(56) References Cited

U.S. PATENT DOCUMENTS

2006/0090644 A1* 5/2006 Sirkar .................... B01D 53/22
                                                                  95/45
2006/0186562 A1* 8/2006 Wright ................. F02M 35/024
                                                                  261/94

(Continued)

FOREIGN PATENT DOCUMENTS

JP          2010005509 A  *  1/2010

OTHER PUBLICATIONS

Machine-generated English translation of JP 2010005509 A, published Jan. 2010.*

*Primary Examiner* — Frank M Lawrence, Jr.
(74) *Attorney, Agent, or Firm* — BOOTH UDALL FULLER, PLC (57) ABSTRACT

A system and method for the collection of carbon dioxide is disclosed. The system includes a liquid sorbent that is a carbon dioxide sorbent, and a plurality of conduits. Each conduit has a hollow interior enclosed by a conduit wall. The conduit wall includes a membrane material that is both hydrophobic, trapping the liquid sorbent inside the hollow interior, and porous, allowing gaseous carbon dioxide to transfer from outside the conduit, through the conduit wall, and into the liquid sorbent. The system also includes a first manifold and a second manifold in fluid communication with the first manifold through the plurality of conduits and a riser. The liquid sorbent flows in a circuit, from the first manifold to the second manifold through the plurality of conduits, and from the second manifold to the first manifold through the riser.

15 Claims, 3 Drawing Sheets

(52) U.S. Cl.
 CPC .... *B01D 53/229* (2013.01); *B01D 2239/0428* (2013.01); *B01D 2252/103* (2013.01); *B01D 2252/30* (2013.01); *B01D 2257/504* (2013.01)

(58) Field of Classification Search
 CPC .......... B01D 2252/103; B01D 2252/30; B01D 2257/504; B01D 2252/10; B01D 2258/06; B01D 63/06; B01D 2313/105; B01D 2317/04; C01B 32/50
 USPC ............. 95/45, 51, 156, 187, 210, 213, 236; 96/7, 8, 265; 423/220, 226–229
 See application file for complete search history.

(56) References Cited

U.S. PATENT DOCUMENTS

| | | | |
|---|---|---|---|
| 2009/0110907 A1* | 4/2009 | Jiang | B01D 53/228 427/373 |
| 2009/0232861 A1* | 9/2009 | Wright | C01B 32/50 423/437.1 |
| 2010/0024651 A1* | 2/2010 | Bansal | B01D 53/229 96/13 |
| 2015/0157980 A1* | 6/2015 | Mochizuki | B01D 63/101 422/177 |
| 2016/0206993 A1* | 7/2016 | Deng | C10L 3/104 |
| 2017/0341942 A1* | 11/2017 | Harper, Jr. | F01K 7/16 |
| 2018/0264399 A1* | 9/2018 | Deng | C10L 3/102 |
| 2019/0240616 A1* | 8/2019 | Eliseev | B01D 61/246 |
| 2021/0060483 A1* | 3/2021 | Lackner | B01D 7/02 |

* cited by examiner

SYSTEM AND METHOD FOR CARBON DIOXIDE CAPTURE THROUGH MEMBRANE CONDUITS

RELATED APPLICATIONS

This application is the U.S. National Stage of International Patent Application No. PCT/US2020/026427 filed Apr. 2, 2020, which claims the benefit of U.S. provisional patent application 62/829,007, filed Apr. 3, 2019 titled "Device, System, And Method For $CO_2$ Capture Through A Tubular Membrane," the contents of each of which are hereby incorporated by reference in their entireties.

TECHNICAL FIELD

Aspects of this document relate generally to carbon dioxide capture, including systems and methods for the collection of carbon dioxide.

BACKGROUND

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis. Nevertheless, the technologies are still new and the early air capture processes require large amounts of energy to operate. Since the carbon dioxide in the ambient air is very dilute, atmospheric carbon dioxide collectors can quickly overrun a tight energy budget for drawing in and processing air in bulk. Additionally, conventional carbon dioxide collection systems often exhibit the unfortunate combination of being costly and fragile. Conventional capture devices also often have a large initial capital cost along with a high operating cost. As carbon dioxide capture will need to occur on a large scale, simple, efficient, low cost designs will play an important role in commercial application of atmospheric carbon dioxide capture technologies.

State of the art direct air capture (DAC) devices can reduce the energy and financial cost, as well as the mechanical complexity and fragility, to a practical level. These DAC devices can passively collect atmospheric carbon dioxide from the ambient air using sorbent materials that capture the carbon dioxide from the atmosphere and subsequently release it for use or sequestration. Many of the sorbents that can be used are liquid. Furthermore, in order to be strong enough to readily bind carbon dioxide in ambient conditions, these liquid sorbents tend to be quite corrosive, posing a safety risk in addition to an implementation hurdle.

SUMMARY

According to one aspect, a system for the collection of carbon dioxide includes a liquid sorbent that is a carbon dioxide sorbent, and a plurality of conduits. Each conduit includes a hollow interior enclosed by a conduit wall. The conduit wall includes a membrane material that is hydrophobic, trapping the liquid sorbent inside the hollow interior, and porous, allowing gaseous carbon dioxide to transfer from outside the conduit, through the conduit wall, and into the liquid sorbent within the hollow interior. The plurality of conduits are closer to vertical than horizontal, each having a radial cross-section that is circular. The system also includes a first manifold and a second manifold in fluid communication with the first manifold through the plurality of conduits and a riser. The first manifold is positioned higher than the second manifold. The liquid sorbent flows in a circuit, from the first manifold to the second manifold through the plurality of conduits, and from the second manifold to the first manifold through the riser. For each conduit of the plurality of conduits, the conduit includes an air-side boundary layer having a boundary layer thickness that is substantially equal to a radius of the conduit. The flow of the liquid sorbent from the first manifold through the plurality of conduits to the second manifold, and from the second manifold through the riser to the first manifold, is driven by passive convection due to an increasing density of the liquid sorbent caused by the evaporation of water from the liquid sorbent while it flows from the first manifold, through the plurality of conduits, to the second manifold, and a decreasing density of the liquid sorbent caused by the addition of replacement water to the liquid sorbent after the liquid sorbent flows through the plurality of conduits. The liquid sorbent has a first density in the first manifold. The first density is chosen such that the passive convection creates a flow rate that results in liquid sorbent that is substantially regenerated when leaving the first manifold is substantially saturated when reaching the second manifold.

Particular embodiments may comprise one or more of the following features. The plurality of conduits may include at least 100 conduits, and/or each conduit of the plurality of conduits may have a radius less than 8 mm. The system may include a sorbent regeneration assembly in fluid communication with the second manifold. The sorbent regeneration assembly may be configured to receive the liquid sorbent and release the carbon dioxide captured within the liquid sorbent using one of an electrolytical process and an electrochemical process, producing a product stream of carbon dioxide. The product stream may be continuous.

According to another aspect of the disclosure, a system for the collection of carbon dioxide includes a liquid sorbent that is a carbon dioxide sorbent, and a plurality of conduits. Each conduit includes a hollow interior enclosed by a conduit wall. The conduit wall includes a membrane material that is hydrophobic, trapping the liquid sorbent inside the hollow interior, and porous, allowing gaseous carbon dioxide to transfer from outside the conduit, through the conduit wall, and into the liquid sorbent within the hollow interior. The system also includes at least one manifold in fluid communication with the plurality of conduits. The liquid sorbent flows in a circuit, flowing out of one of the at least one manifold, through the plurality of conduits, and into one of the at least one manifold.

Particular embodiments may comprise one or more of the following features. The at least one manifold may include a first manifold and a second manifold in fluid communication with the first manifold through the plurality of conduits and a riser. The circuit through which the liquid sorbent flows may be from the first manifold to the second manifold through the plurality of conduits and from the second manifold to the first manifold through the riser. Each conduit of the plurality of conduits may have a radial cross-section that is circular. Each conduit of the plurality of conduits may have a radial cross-section that is wider in a first radial direction than in a second radial direction. The first radial direction may form an angle with the second radial direction that is between 0 and 180 degrees. The flow of the liquid sorbent from the first manifold through the plurality of conduits to the second manifold, and from the second manifold through the riser to the first manifold, may be driven by passive convection due to an increasing density of the liquid sorbent caused by the evaporation of water from the liquid sorbent while it flows from the first manifold, through the plurality of conduits, to the second manifold, and a decreasing density of the liquid sorbent caused by the addition of replacement water to the liquid sorbent after the liquid sorbent flows through the plurality of conduits, resulting in a flow rate. The system may also include a liquid pump in fluid communication with one of the first manifold and the second manifold. The flow of the liquid sorbent from the first manifold through the plurality of conduits to the second manifold, and from the second manifold through the riser to the first manifold, may be driven by the liquid pump at a flow rate. The first manifold may be located higher than the second manifold and/or the plurality of conduits may be closer to vertical than horizontal. The system may also include a sorbent regeneration assembly in fluid communication with the second manifold. The sorbent regeneration assembly may be configured to receive the liquid sorbent and release the carbon dioxide captured within the liquid sorbent, producing a product stream of carbon dioxide. The liquid sorbent may be a hydroxide solution. The liquid sorbent may be an ionic liquid. The liquid sorbent may have a first density in the first manifold. The first density may be chosen such that passive convection creates a flow rate that may result in liquid sorbent that is substantially regenerated when leaving the first manifold is substantially saturated when reaching the second manifold. The liquid pump may be configured to drive the liquid sorbent at a flow rate that may result for liquid sorbent that is substantially regenerated when leaving the first manifold is substantially saturated when reaching the second manifold. For each conduit of the plurality of conduits, the conduit may include an air-side boundary layer having a boundary layer thickness that may be substantially equal to a radius of the conduit.

According to yet another aspect of the disclosure, a method for collecting carbon dioxide includes circulating a liquid sorbent within a carbon dioxide collection system including a first manifold, a second manifold, a plurality of conduits, and a riser. The liquid sorbent passes from the first manifold to the second manifold through the plurality of conduits and from the second manifold to the first manifold through the riser. The first manifold and second manifold are in fluid communication through the riser and the plurality of conduits, each conduit of the plurality of conduits having a hollow interior enclosed by a conduit wall. The conduit wall includes a membrane material that is hydrophobic and porous, the liquid sorbent passing through the hollow interior of each conduit of the plurality of conduits. The method also includes receiving and capturing gaseous carbon dioxide as the gaseous carbon dioxide transfers, for each conduit of the plurality of conduits, from outside the conduit, through the conduit wall, and into the liquid sorbent flowing through the hollow interior of the conduit as the liquid sorbent flows from the first manifold to the second manifold.

Particular embodiments may comprise one or more of the following features. Circulating the liquid sorbent within the carbon dioxide system may include increasing a density of the liquid sorbent as it flows from the first manifold to the second manifold by allowing water to evaporate from the liquid sorbent as the liquid passes through the hollow interiors of the plurality of conduits. The method may also include decreasing the density of the liquid sorbent after the liquid sorbent passes through the plurality of conduits by adding replacement water to the liquid sorbent. The circulation of the liquid sorbent may be driven by convection caused by the density gradient, resulting in a flow rate. The carbon dioxide collection system may also include a liquid pump. Circulating the liquid sorbent within the carbon dioxide system may include driving the liquid sorbent through the system at a flow rate using the liquid pump. The first manifold may be positioned higher than the second manifold and/or the plurality of conduits may be closer to vertical than horizontal. The method may also include regenerating the liquid sorbent using a sorbent regeneration assembly in fluid communication with the second manifold. The sorbent regeneration assembly may be configured to receive the liquid sorbent and release the carbon dioxide captured within the liquid sorbent, producing a product stream of carbon dioxide. The sorbent regeneration assembly may release the carbon dioxide from the liquid sorbent using one of an electrolytical process and an electrochemical process. Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis. Nevertheless, the technologies are still new and the early air capture processes require large amounts of energy to operate. Since the carbon dioxide in the ambient air is very dilute, atmospheric carbon dioxide collectors can quickly overrun a tight energy budget for drawing in and processing air in bulk. Additionally, conventional carbon dioxide collection systems often exhibit the unfortunate combination of being costly and fragile. Conventional capture devices also often have a high initial capital cost along with a high operating cost. As carbon dioxide capture will need to occur on a large scale, simple, efficient, low cost designs will play an important role in commercial application of atmospheric carbon dioxide capture technologies.

State of the art direct air capture (DAC) devices can reduce the energy and financial cost, as well as the mechanical complexity and fragility, to a practical level. These DAC devices can passively collect atmospheric carbon dioxide from the ambient air using sorbent materials that capture the carbon dioxide from the atmosphere and subsequently release it for use or sequestration. Many of the sorbents that can be used are liquid. Furthermore, in order to be strong enough to readily bind carbon dioxide in ambient conditions, these liquid sorbents tend to be quite corrosive, posing a safety risk in addition to an implementation hurdle.

Contemplated herein is a system and method for carbon dioxide capture using a plurality of conduits through which a liquid sorbent flows. According to various embodiments, the sorbent liquid flows in a circuit, absorbing carbon dioxide through a membrane material that makes up the walls of the conduits. Containing the liquid sorbent within a conduit protects against direct contact with the caustic materials while still permitting exposure to the atmosphere and the carbon dioxide it comprises. By making the use of liquid sorbents safer, the systems and devices contemplated herein may be deployed in areas that would be too risky to use such caustic materials, such as in an urban environment. As will be discussed further, below, the conduits comprise a porous membrane, allowing carbon dioxide to pass through while preventing the liquid sorbent from escaping.

Additionally, the system and method contemplated herein is advantageous over many other carbon dioxide capture systems, in that it can produce a continuous product stream of carbon dioxide, while still employing a simple and easy to maintain structure. Other capture systems will often have to rely on the batch operation of multiple DAC units working together to provide a product stream that is more or less continuous. Various embodiments of the system contemplated herein is able to operate with a continuous capture and release process using a single unit.

It should be noted that while the following discussion is made in the context of systems and devices that passively capture carbon dioxide from the atmosphere, the various embodiments contemplated herein may be readily adapted for use in capturing carbon dioxide from non-atmospheric sources (e.g. upgrading gas captured using these or other methods, etc.), and may also be readily adapted for use in non-passive systems (e.g. using forced air, etc.). Furthermore, some embodiments are also capable of supporting active membrane materials that pump carbon dioxide against a potential.

Figure 1:
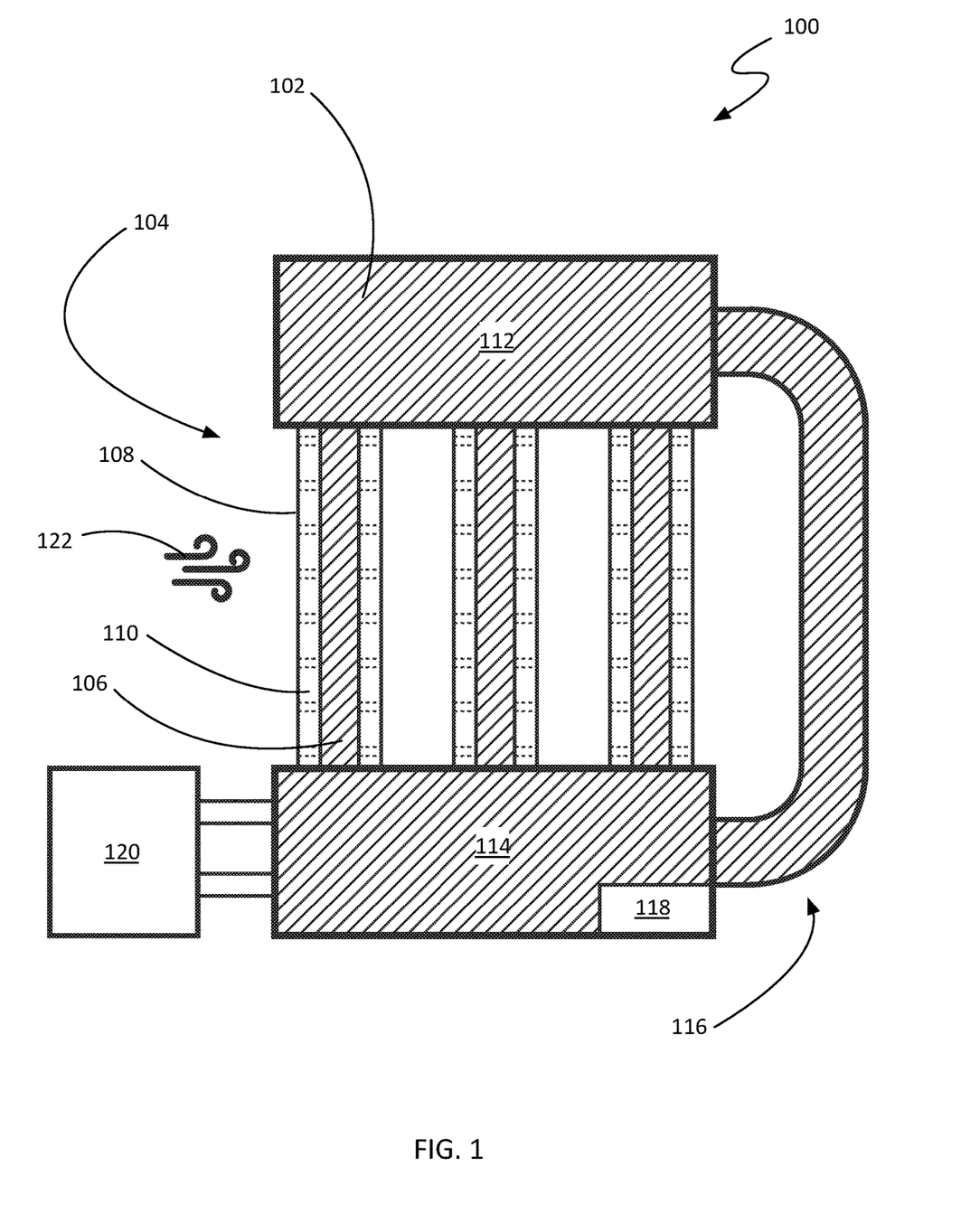
FIG. 1 is a schematic view of a system for the collection of carbon dioxide using membrane conduits.

FIG. 1 is a schematic view of a non-limiting example of a system 100 for the collection of carbon dioxide. As shown, the system 100 comprises a liquid sorbent 102 contained within, and flows through, a plurality of conduits 104. These conduits 104 are connected to at least one manifold; in some embodiments, including the non-limiting example shown in FIG. 1, the conduits 104 connect a first manifold 112 to a second manifold 114. These two manifolds may also be in fluid communication with each other through a riser 116, forming a fluidic circuit. Some embodiments may also comprise a liquid pump 118 and a sorbent regeneration assembly 120, as shown.

Figure 2:
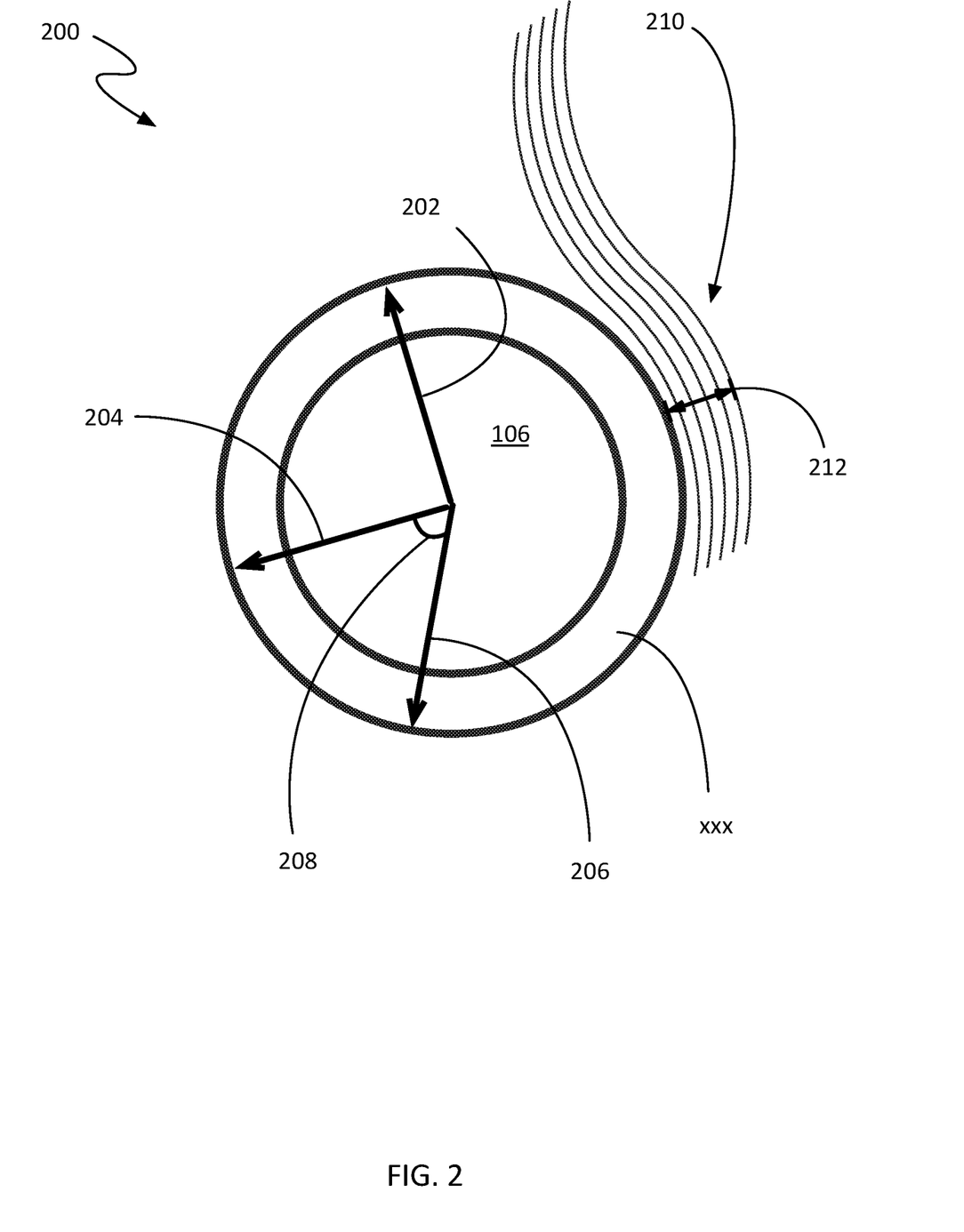
FIG. 2 is a cross-sectional view of a single conduit.
Figure 3:
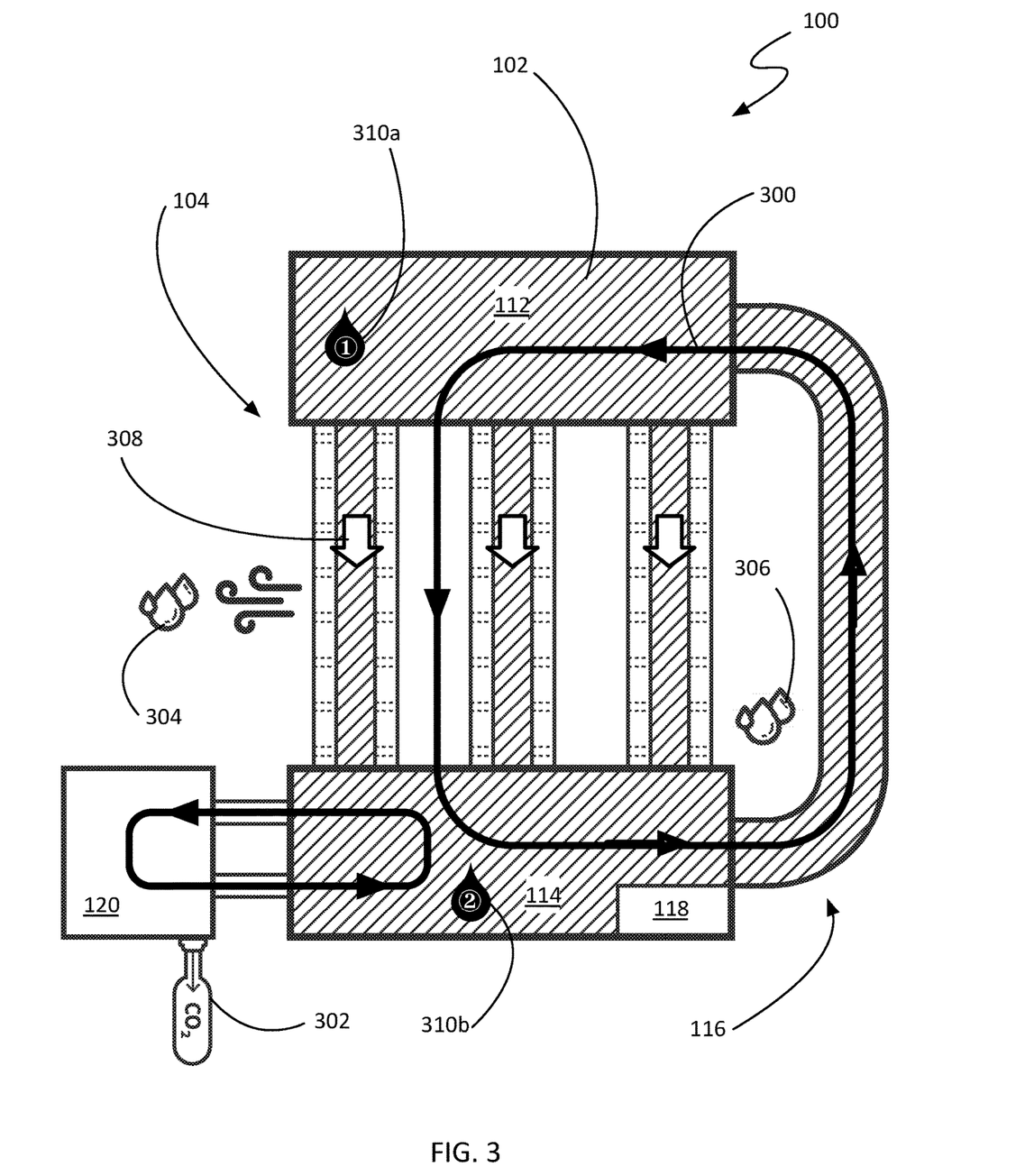
FIG. 3 is a process view of the system of FIG. 1.

The liquid sorbent 102 is partially exposed to the atmosphere as it flows through the conduits 104, according to various embodiments. In the context of the present description and the claims that follow, a conduit 104 is any hollow structure comprising a membrane material 110 that can contain a liquid sorbent 102 while permitting gas transfer. The conduits 104 protect a strong liquid sorbent 102 from direct contact with the air, and potentially sensitive materials such as human skin. The conduits 104 will be discussed in greater detail with respect to FIG. 2, below. It should be noted that the conduits 104 shown in FIGS. 1-3 are not drawn to scale, but instead are exaggerated in size and reduced in number, for illustrative purposes.

Each conduit 104 has a hollow interior 106 formed by a conduit wall 108 composed, at least in part, of a membrane material 110. The membrane material 110 is able to contain the liquid sorbent 102 while also allowing carbon dioxide to pass through the conduit wall 108. A non-limiting example of such a membrane material 110 are membrane materials 110 having very fine pores in a hydrophobic material. The hydrophobic material helps avoid pushing fluid through the membrane 110, as it prevents liquid flow through the pores due to a high capillary pressure. The pores allow gaseous carbon dioxide 122 to flow from outside of the conduit 104, through the conduit wall 108, and into the liquid sorbent 102 flowing through the hollow interior 106. The size of the pores and the degree of hydrophobicity determines the maximum pressure the liquid sorbent 102 can be under without compromising the operation of the device, and may constrain system geometries, as will be discussed further, below.

Other applications for the contacting geometries contemplated herein occur with membrane materials 110 that can actively pump carbon dioxide from a dry air stream into a moist air stream, or an aqueous solution. The carbon dioxide chemical potential is increased by the drop of chemical potential due to water molecules leaving the system. The transport mechanism is the membrane 110 itself. In some of those embodiments, the conduits 104 contain a weak sorbent, or even moist air, to carry away the carbon dioxide. In embodiments using weak sorbent or moist air, it is the pumping action of the membrane 110 rather than the interior liquid sorbent 102 that collects the carbon dioxide 122.

In some embodiments the conduits 104 are composed entirely of a membrane material 110, while in other embodiments, the conduits 104 may employ other materials, in addition to the membrane materials 110. For example, in some embodiments, particularly in embodiments using a membrane material 110 that lacks structural strength, the conduit 104 may be composed of segments of membrane material 110 joined and strengthened by a scaffolding material.

As will be discussed below with respect to FIG. 2, transfer of gas from an external or ambient air current, through a membrane 110, to the liquid sorbent 102 inside a conduit 104, will depend upon the fluid dynamic characteristics of the conduit 104, such as the thickness of the boundary layer on the outside of the conduit 104, and also the ability to transport carbon dioxide away from the interior surface of the conduit 104. In some embodiments, conduits 104 composed entirely of membrane material 110 may be easier to make smooth and thereby reduce the air-side boundary layer thickness. In other embodiments, a conduit 104 may be composed of membrane material 110 coupled to or integral with other materials that may provide structural or manufacturing advantages that could outweigh any boundary layer thickening caused by discontinuities in the surfaces.

The liquid sorbent 102 is a carbon dioxide sorbent. A variety of liquid sorbents 102 may be used, so long as they are compatible with the membrane material 110 used to construct the conduits 104. Examples of liquid sorbents 102 include, but are not limited to, strong alkaline liquids including various hydroxide solutions, ionic liquids, organic compounds, and the like. The choice of liquid sorbent 102 may be directed by the membrane material 110 being used in the conduits 104, which in turn may be dictated by the geometry of the system 100 as well as the individual conduits 104. Another factor in choice of liquid sorbent 102 is the desired regeneration process, which will be discussed further, below.

According to various embodiments, the system 100 comprises at least one manifold, or reservoir, that is in fluid communication with the plurality of conduits 104. In some embodiments, the system 100 may have a single manifold connected to both ends of the plurality of conduits 104, forming a loop. Such a configuration may be advantageous for some system geometries that do not require great structural stability and are small enough to make use of a flow driver that does not require much energy. As an option, the conduit 104 loops may be arranged to be circular or spiraling, thereby removing any favored wind direction and making the system 100 omnidirectional, with respect to air currents. Other embodiments may have two or more manifolds. Some embodiments, including the non-limiting example shown in FIG. 1, may have a first manifold 112 and a second manifold 114. The two manifolds are in fluid communication with each other through at least the plurality of conduits 104.

According to various embodiments, the first manifold 112 and the second manifold 114 are also in fluid communication through a riser 116, forming a circuit. While the geometry and materials of the conduits 104 may be dictated by a balance between exposed surface area, pressure drop, transfer coefficients, and the like, the main purpose of the riser 116 is to get the liquid sorbent 102 from the second manifold 114 back to the first manifold 112 in an efficient manner. The riser 116 is typically much larger, in terms of cross-sectional area, than a single conduit 104. Those skilled in the art will recognize that the function of the riser 116 may be accomplished in a number of ways using a number of structures. For example, in some embodiments, the riser may comprise multiple pipes or tubes, while in other embodiments, the riser 116 may be a single pipe.

In some embodiments, the system 100 may also comprise a sorbent regeneration assembly 120. In the context of the present description and the claims that follow, a sorbent regeneration assembly 120 is an assembly that is configured to release the carbon dioxide from the liquid sorbent 102, forming a product stream and preparing the liquid sorbent 102 to continue capturing carbon dioxide. In some embodiments, the sorbent regeneration assembly 120 may make use of an electrolytical process, an electrochemical process, or the like.

In some embodiments, the system 100 may comprise a sorbent regeneration assembly 120, while in other embodiments, the laden liquid sorbent 102 may be sent to a separate system for regeneration. The non-limiting example shown in FIG. 1 shows the assembly 120 coupled to the second manifold 114. In other embodiments, a regeneration assembly 120 may be coupled to other parts of the system 100, such as the first manifold 112 or the riser 116. Regeneration of the liquid sorbent will be discussed further with respect to FIG. 3, below.

Systems 100 making use of a plurality of conduits 104 may employ many conduits 104. The number and arrangement of the conduits 104 may be chosen to maximize the exposed surface area while still allowing sufficient airflow to pass among the conduits 104. According to various embodiments, the conduits 104 may number from the hundreds to the thousands, per device.

The system 100 may be implemented in a variety of geometries. The non-limiting example shown in FIG. 1 positions the first manifold 112 above or higher than the second manifold 114, and the plurality of conduits 104 are closer to vertical than horizontal. However, it should be noted that while this discussion is done in the context of an embodiment having vertical conduits 104, other embodiments could make use of conduits 104 having a central axis that is vertical, horizontal, or at an intermediate angle. Some embodiments may be configured specifically such that the central axes of the conduits 104 are normal to the incident air flow (e.g. a vertical configuration would be normal to horizontal winds; in such a configuration a conduit 104 would be orthogonal to any horizontal wind).

The conduits 104 making up the plurality of conduits 104 may themselves be arranged in a variety of ways. For example, in one embodiment the conduits 104 may be arranged in a circular pattern, so that they form a vertical column to maximize exposure of many conduits 104 to wind from any direction. Other embodiments may make use of arrangements that are less symmetrical, favoring one direction over another, which may be advantageous for use in places with incident air flow consistently coming from a particular direction.

Some embodiments may be tall and linear, such as the non-limiting example shown in FIG. 1. As shown, the tall columnar geometry may be advantageous in environments where a small footprint is desired, such as an urban environment. Columnar units may be spaced apart from each other to avoid interfering with each other. Some embodiments may be more than ten meters in height. Some embodiments may even be stylized as trees or other tall structures.

As previously mentioned, the height of these vertical or mostly vertical geometries is typically limited by capillary pressure of the pores in the membrane material 110. Finer pores provide greater capillary pressure, meaning the conduits 104 are able to withstand higher hydrostatic pressures before liquid sorbent 102 escapes through the pores, and can thus be used in taller geometries.

Other embodiments may have a similar geometry, but the conduits may be closer to horizontal than vertical. A horizontal geometry has the advantage of not having to fight hydrostatic pressure with the capillary pressure of the pores, or at least not having to fight so hard. Additionally, these geometries are able to move the sorbent 102 through the circuit without having to fight gravity as done in the vertical embodiments, meaning the mechanism or phenomenon used to drive the flow has lower energy requirements. This means that certain methods for driving the flow that would be impractical for vertical geometries may be feasible in the horizontal geometries. However, these advantages can come at the cost of a larger footprint, and possibly less exposure to airflows. Some geometries may employ circular loops, or concentric circular loops or spirals, which would have no favored wind direction.

Still other embodiments may employ short geometries, which may be advantageous in not needing the level of scaffolding or external support as a tall geometry needs, significantly reducing the capital cost. The lower cost may allow for the creation of more units, offsetting their reduced capacity in comparison to taller designs employing scaffolding. Some embodiments may make use of loops of conduit 104 that may blow in the wind like bunch grass. It should be noted that the methods contemplated herein, particularly the use of conduits 104 made of carbon dioxide permeable membrane materials 110, may be adapted to other geometries and configurations as well.

It should be noted that some of the geometric arrangements of the carbon dioxide collecting structure disclosed herein are also suitable for conduits 104 made of membrane materials 110 that actively pump carbon dioxide against a concentration gradient while releasing water to the dry environment.

The remaining discussion will proceed in the context of a system 100 where the first and second manifolds are connected by a number of vertical conduits 104 comprising membrane materials 110 that are sufficiently hydrophobic and have pores sufficiently small that the flow of liquid sorbent 102 through the conduit wall 108 is avoided while the system 100 is operating at internal pressures resulting from the vertical configuration.

FIG. 2 is a cross-sectional view of a non-limiting example of a single conduit 104. Specifically, it shows a radial cross-section 200. In some embodiments, the cross section of the conduits 104 may be roughly symmetrical about the central axis. In some embodiments, the conduits 104 may have a radial cross-section 200 that is circular, or substantially circular (e.g. radii equal to within 5%, etc.). The circular cross section may be utilized to permit capture from wind or air currents efficiently regardless of what direction (i.e. angle of approach within a plane normal to the central axis of the conduit 104) the airflow is approaching the conduit 104 from. This flexibility is advantageous for implementations that passively capture carbon dioxide from natural air currents such as wind that may change direction.

The conduits 104 may have non-circular cross sections, which may be advantageous for use in circumstances where the airflow is predictable, and may offer structural and/or manufacturing advantages. For example, in one embodiment, each conduit has a radial cross-section 200 that is wider in a first radial direction 204 than in a second radial direction 206, with those two radial directions forming an angle 208 is between 0 and 180 degrees. In some embodiments, the cross section may be much larger in one radial direction than another, even one or more orders of magnitude larger. Such conduits 104 may have the appearance of a hollow sheet or other sheet-like structure. Some conduits 104 may even have leaf-like geometries.

The dimensions of the conduits 104 may be designed for an improved uptake rate of carbon dioxide on the surface of the membrane 110. Flow rates are designed to match the uptake rates from the air, according to various embodiments. The uptake rate on the conduit wall 108 (i.e. membrane 110) will depend on the material choice for the membrane 110, and on the choice of the liquid sorbent 102. For strong alkaline liquids, the transport rate inside the conduit 104 may also be limited by the transfer rate inside the liquid, in addition to the transfer rate through the wall 108. These mass transfer coefficients can be matched with the mass transfer coefficient across the boundary layer 210 along the outer surface of the conduit 104 (e.g. the air-side boundary layer 210 created as air flows past the conduit 104). Matching these coefficients constrains the dimensions of the conduit 104 (e.g. the radius 202 of a conduit 104, etc.), according to various embodiments.

As previously mentioned, the way a conduit behaves in a fluid may dictate or limit usable geometries and sizes. According to various embodiments, a method for configuring the dimensions of a conduit 104 may include selecting an appropriate air-side boundary layer thickness 212 for the exterior of the conduit 104. It should be noted that when configuring the dimensions of a conduit 104 while taking into account the boundary layer thickness 212, the boundary layer thickness 212 is considered for anticipated air flow conditions that may be specific for a particular implementation. For example, the anticipated boundary layer thickness 212 may be determined for anticipated environmental factors that can influence the fluid dynamics, such as temperature, humidity, and the like.

In a fluid, be it a liquid or a gas the transport rate of a component of the fluid due to a concentration gradient is given by the diffusion constant times the concentration gradient. Thus, as a figure of merit, $D\rho/L$, can be held as a measure of the maximum transport. Here D is the diffusion constant, $\rho$ is the density of the component and L the critical distance, over which it can change (e.g., the boundary layer thickness 212). It is worth noting that for a strong alkaline solution and air, the value of $D\rho$ are quite similar. Air has a much higher diffusion constant than a liquid, but it also has a much smaller density. As a result, a tubular design with a slow flow of air around it, and a boundary layer thickness 212 on the order of the conduit radius 202, will naturally match the transfer coefficients on the inside and the outside. The preferred diameter of the conduit 104 will then be determined by the transfer coefficient through the wall 108, or other rate limiting steps in the transfer. Based on observations of hydroxide solutions directly exposed to air, typical radii could range from 0.1 to 10 mm, according to various embodiments. In some embodiments, each conduit 104 has a boundary layer thickness 212 that is substantially equal (e.g. within a factor of 3, etc.) to a radius 202 of the conduit 104. A more detailed discussion of scale, dimension, and energy considerations for exemplary, non-limiting embodiments is provided as an Appendix.

For small conduits 104 and low flow speeds, the boundary layer thickness 212 may be directly related to the dimensions of the conduit 104. The boundary layer thickness 212 results in a transfer coefficient for carbon dioxide from the open air to the surface of the conduit 104, which is given by the diffusion constant divided by the thickness of the boundary layer. This coefficient can be matched to the membrane materials 110 transfer coefficient, which in turn can be matched to the transfer coefficient on the liquid side. By selecting liquid sorbents 102, membrane materials 110, and conduit 104 geometries such that these coefficients are substantially similar to each other, none of the various transfers dominates the process. As a specific example, uptake rates of carbon dioxide into aqueous hydroxide liquid sorbents suggest a few millimeters in diameter as a typical scale for a conduit 104. However, other materials may result in different sizes.

For example, in vertical geometries, the height of the fluid circuit, particularly in a geometry similar to FIG. 1, may be chosen so that hydrostatic head pressure in the conduit 104 is not sufficient to push liquid sorbent 102 through the membrane 110. The diameter of the conduits 104 may be chosen large enough that pressures drops in the conduit 104 from flow friction are negligible. Typical sizes range from a fraction of a millimeter to a few millimeters for the diameter of the conduit 104. In some embodiments, the radius 202 may be less than 8 mm.

As the conduits 104 are made thinner, however, the energy needed to push the liquid sorbent 102 through the conduit 104 from the first manifold 112 to the second manifold 114 will exceed the hydrostatic pressure drop and could become quite large. If the pressure drop is kept low enough, a process such as convection may be relied on to drive the flow from the second manifold 114 through the riser into the first manifold 112 and back to the second manifold 114, with the energy derived from a density gradient that is established in the conduits 104 as water evaporates; if the conduits 104 are made narrow enough, though, additional flow drivers may be needed, such as a liquid pump 118. For conduits 104 having a radius 202 on par with a drinking straw (i.e. a few millimeters), the energy needed to drive the circuit is low.

FIG. 3 is a process view of a non-limiting example of a system for the collection of carbon dioxide. According to various embodiments, the liquid sorbent 102 is driven in a fluid circuit 300 that comprises a segment where the liquid sorbent 102 passes through the plurality of conduits 104, absorbing carbon dioxide that passes through the conduit wall 108. It should be noted that while the following discussion is done in the context of a system 100 using a liquid sorbent 102 that is a hydroxide solution that results in a carbonate as it gets loaded with carbon dioxide, other liquid sorbents 102 may be employed, including those previously discussed. The liquid sorbent 102 moves through the circuit 300 at a flow rate 308.

In some embodiments, the liquid sorbent 102 may continue to recirculate in the system 100 until the carbon dioxide loading reaches saturation. Once fully laden, the captured carbon dioxide is released and the process begins again. In some embodiments, the carbonate is removed from the system and processed in a subsequent step, while in others the laden sorbent is processed within the system 100. For example, the laden sorbent may be processed by the sorbent regeneration assembly 120.

In other embodiments, the liquid collected in the second or lower manifold 114 is processed for removal of the carbon dioxide content and then returned to the first or upper manifold 112 on each cycle. This approach may advantageously reduce the overall flow speeds. The captured carbon dioxide could be removed from the laden liquid sorbent 102 using various methods, including but not limited to electrochemical processes, an electrolytical process to combine water splitting with the carbon dioxide regeneration, a derivative of the Kraft process, or any other process known in the art. Ultimately, the liquid is returned in a more alkaline form. This continuous flow of liquid sorbent 102 allows the system 100, in some embodiments, to produce a continuous product stream 302 of carbon dioxide.

In some embodiments, the flow of the liquid sorbent 102 through the circuit 300 is driven by passive convection. Assuming the liquid sorbent 102 has a first density 310$a$ when in the first manifold 112. As the liquid sorbent 102 leaves the first manifold 112 and passes through the conduits 104, a portion of water 304 from the liquid sorbent 102 evaporates and is lost through the membrane material 110. This results in an increasing density of the liquid sorbent 102; when reaching the second manifold 114, the liquid sorbent 102 is at a second density 310$b$. According to various embodiments, replacement water 306 may be added to the system 100 in the second manifold 114 to maintain volume, reducing the density of the liquid sorbent 102. This less dense liquid gets pushed up the riser 116 by the heavier liquid coming down the conduits 104, thus driving the liquid sorbent 102 through the circuit 300 at a flow rate 308.

This passive convection flow rate may be slow. However, the flow rate 308 may be modified by changing the first density 310$a$ of the liquid sorbent 102. In some embodiments, the first density 310$a$ may be chosen such that the liquid sorbent 102 flows at a flow rate 308 that results in liquid sorbent 102 that is substantially regenerated when leaving the first manifold 112 is substantially saturated when reaching the second manifold 114, thereby removing the need to make multiple laps before regenerating the sorbent. In the context of the present description and the claims that follow, substantially regenerated and substantially saturated mean the sorbent is within 40% or less of entirely empty or entirely full of absorbed carbon dioxide, respectively. Such a configuration may be used to provide a continuous product stream 302 of carbon dioxide, according to various embodiments.

In some embodiments, the energy needed to bring the liquid sorbent 102 up to the first manifold 112 from the second manifold 114 is small enough that the circuit 300 may be driven entirely by passive convection. As a specific example, in one embodiment, where the conduits 104 are roughly the width of drinking straws, a 5$m$ tall system may be driven entirely by passive convection.

In other embodiments, the conduits 104 may be narrow enough, or some aspect of the system 100 is such that the required energy exceeds what can be provided by passive convection, and additional driving is needed. For example, in some embodiments, a liquid pump 118 may provide the needed additional push to get the circuit to flow or at least flow at sufficient speed. In some cases, the contribution of passive convection is large enough that, while not able to do the job alone, it augments the effort of the liquid pump 118 (or other device) enough that it may power requirements able to be satisfied with a small power source, such as power provided by solar or thermoelectric devices.

In still other embodiments, the system 100 may rely mostly on an active driver, such as the liquid pump 118. For example, in cases where the rate of water evaporation, or the very nature of the liquid solvent itself, does not create a density gradient sufficient to drive the process, additional input is needed to achieve the desired flow rate. As an option, similar to the embodiments discussed above, embodiments making use of a liquid pump 118 may be configured such that the liquid pump 118 drives the flow at a rate that results in liquid sorbent that is substantially regenerated when leaving the first manifold is substantially saturated when reaching the second manifold.

It will be understood that implementations are not limited to the specific components disclosed herein, as virtually any components consistent with the intended operation of a method and/or system implementation for carbon dioxide capture through membrane conduits be utilized. Accordingly, for example, although particular conduits 104 and conduit 104 configurations may be disclosed, such components may comprise any shape, size, style, type, model, version, class, grade, measurement, concentration, material, weight, quantity, and/or the like consistent with the intended operation of a method and/or system implementation for carbon dioxide capture through membrane conduits may be used. In places where the description above refers to particular implementations of devices, systems, and/or methods for carbon dioxide capture through membrane conduits, it should be readily apparent that a number of modifications may be made without departing from the spirit thereof and that these implementations may be applied to other carbon dioxide capture technologies.

What is claimed is:

1. A system for the collection of carbon dioxide, comprising:
    a liquid sorbent that is a carbon dioxide sorbent;
    a plurality of conduits, each conduit comprising a hollow interior enclosed by a conduit wall, the conduit wall comprising a membrane material that is hydrophobic, trapping the liquid sorbent inside the hollow interior, and porous, allowing gaseous carbon dioxide to transfer from outside the conduit, through the conduit wall, and into the liquid sorbent within the hollow interior, the plurality of conduits being closer to vertical than horizontal, each having a radial cross-section that is circular; and
    a first manifold and a second manifold in fluid communication with the first manifold through the plurality of conduits and a riser, the first manifold positioned higher than the second manifold;
    wherein the liquid sorbent flows in a circuit, from the first manifold to the second manifold through the plurality of conduits, and from the second manifold to the first manifold through the riser;
    wherein, for each conduit of the plurality of conduits, the conduit comprises an air-side boundary layer having a boundary layer thickness that is substantially equal to a radius of the conduit;
    wherein the flow of the liquid sorbent from the first manifold through the plurality of conduits to the second manifold, and from the second manifold through the riser to the first manifold, is driven by passive convection due to an increasing density of the liquid sorbent caused by the evaporation of water from the liquid sorbent while it flows from the first manifold, through the plurality of conduits, to the second manifold, and a decreasing density of the liquid sorbent caused by the addition of replacement water to the liquid sorbent after the liquid sorbent flows through the plurality of conduits;
    wherein the liquid sorbent has a first density in the first manifold; and
    wherein the first density is chosen such that the passive convection creates a flow rate that results in liquid sorbent that is substantially regenerated when leaving the first manifold is substantially saturated when reaching the second manifold.

2. The system of claim 1, wherein the plurality of conduits comprises at least 100 conduits, and wherein each conduit of the plurality of conduits has a radius less than 8 mm.

3. The system of claim 1, further comprising:
    a sorbent regeneration assembly in fluid communication with the second manifold, the sorbent regeneration assembly configured to receive the liquid sorbent and release the carbon dioxide captured within the liquid sorbent using one of an electrolytical process and an electrochemical process, producing a product stream of carbon dioxide.

4. The system of claim 3, wherein the product stream is continuous.

5. A system for the collection of carbon dioxide, comprising:
    a liquid sorbent that is a carbon dioxide sorbent;
    a plurality of conduits, each conduit comprising a hollow interior enclosed by a conduit wall, the conduit wall comprising a membrane material that is hydrophobic, trapping the liquid sorbent inside the hollow interior, and porous, allowing gaseous carbon dioxide to transfer from outside the conduit, through the conduit wall, and into the liquid sorbent within the hollow interior; and
    at least one manifold in fluid communication with the plurality of conduits, the at least one manifold comprising a first manifold and a second manifold in fluid communication with the first manifold through the plurality of conduits and a riser;

wherein the liquid sorbent flows in a circuit, flowing out of one of the at least one manifold, through the plurality of conduits, and into one of the at least one manifold;

wherein the circuit is from the first manifold to the second manifold through the plurality of conduits and from the second manifold to the first manifold through the riser; and wherein the flow of the liquid sorbent from the first manifold through the plurality of conduits to the second manifold, and from the second manifold through the riser to the first manifold, is driven by passive convection due to an increasing density of the liquid sorbent caused by the evaporation of water from the liquid sorbent while it flows from the first manifold, through the plurality of conduits, to the second manifold, and a decreasing density of the liquid sorbent caused by the addition of replacement water to the liquid sorbent after the liquid sorbent flows through the plurality of conduits, resulting in a flow rate.

6. The system of claim 5, wherein the plurality of conduits comprises at least 100 conduits.

7. The system of claim 5, wherein each conduit of the plurality of conduits has a radius less than 8 mm.

8. The system of claim 5, wherein the liquid sorbent is a hydroxide solution.

9. The system of claim 5, wherein the liquid sorbent is an ionic liquid.

10. The system of claim 5, wherein, for each conduit of the plurality of conduits, the conduit comprises an air-side boundary layer having a boundary layer thickness that is substantially equal to a radius of the conduit.

11. A method for collecting carbon dioxide, comprising:
circulating a liquid sorbent within a carbon dioxide collection system comprising a first manifold, a second manifold, a plurality of conduits, and a riser, the liquid sorbent passing from the first manifold to the second manifold through the plurality of conduits and from the second manifold to the first manifold through the riser, the first manifold and second manifold in fluid communication through the riser and the plurality of conduits, each conduit of the plurality of conduits comprising a hollow interior enclosed by a conduit wall, the conduit wall comprising a membrane material that is hydrophobic and porous, the liquid sorbent passing through the hollow interior of each conduit of the plurality of conduits;

receiving and capturing gaseous carbon dioxide as the gaseous carbon dioxide transfers, for each conduit of the plurality of conduits, from outside the conduit, through the conduit wall, and into the liquid sorbent flowing through the hollow interior of the conduit as the liquid sorbent flows from the first manifold to the second manifold; and regenerating the liquid sorbent using a sorbent regeneration assembly in fluid communication with the second manifold, the sorbent regeneration assembly configured to receive the liquid sorbent and release the carbon dioxide captured within the liquid sorbent, producing a product stream of carbon dioxide;

wherein the sorbent regeneration assembly releases the carbon dioxide from the liquid sorbent using one of an electrolytical process and an electrochemical process.

12. The method of claim 11, wherein circulating the liquid sorbent within the carbon dioxide system comprises:
increasing a density of the liquid sorbent as it flows from the first manifold to the second manifold by allowing water to evaporate from the liquid sorbent as the liquid passes through the hollow interiors of the plurality of conduits; and decreasing the density of the liquid sorbent after the liquid sorbent passes through the plurality of conduits by adding replacement water to the liquid sorbent;

wherein the circulation of the liquid sorbent is driven by passive convection caused by the density gradient, resulting in a flow rate;

wherein the liquid sorbent has a first density in the first manifold, and wherein the first density is chosen such that the passive convection creates a flow rate that results in liquid sorbent that is substantially regenerated when leaving the first manifold is substantially saturated when reaching the second manifold.

13. The method of claim 11, wherein the carbon dioxide collection system further comprises a liquid pump, wherein circulating the liquid sorbent within the carbon dioxide system comprises driving the liquid sorbent through the system at a flow rate using the liquid pump, and wherein the liquid pump is configured to drive the liquid sorbent at a flow rate that results in liquid sorbent that is substantially regenerated when leaving the first manifold and is substantially saturated when reaching the second manifold.

14. The method of claim 11, wherein the first manifold is positioned higher than the second manifold and the plurality of conduits are closer to vertical than horizontal.

15. The method of claim 11, wherein the product stream is continuous.

* * * * *